(12) United States Patent
Goodnough et al.

(10) Patent No.: US 8,463,078 B2
(45) Date of Patent: Jun. 11, 2013

(54) MULTI-BANK TDI APPROACH FOR HIGH-SENSITIVITY SCANNERS

(75) Inventors: Mark Goodnough, Santa Ynez, CA (US); Gene D. Tener, Oviedo, FL (US)

(73) Assignee: Lockheed Martin Corporation, Orlando, FL (US)

( * ) Notice: Subject to any disclaimer, the term of this patent is extended or adjusted under 35 U.S.C. 154(b) by 1328 days.

(21) Appl. No.: 12/230,100

(22) Filed: Aug. 22, 2008

(65) Prior Publication Data

US 2010/0046853 A1   Feb. 25, 2010
US 2012/0230602 A9   Sep. 13, 2012

Related U.S. Application Data

(60) Provisional application No. 60/957,612, filed on Aug. 23, 2007.

(51) Int. Cl.
- *G06K 7/00* (2006.01)
- *G06K 9/20* (2006.01)
- *H04N 3/14* (2006.01)
- *H04N 5/225* (2006.01)
- *H04N 5/335* (2011.01)

(52) U.S. Cl.
USPC .................. 382/312; 348/218.1; 348/295

(58) Field of Classification Search
USPC .............. 382/294, 312; 348/144, 145, 218.1, 348/295
See application file for complete search history.

(56) References Cited

U.S. PATENT DOCUMENTS

| | | | | |
|---|---|---|---|---|
| 4,080,634 A * | 3/1978 | Schreiber | | 358/3.06 |
| 4,837,431 A * | 6/1989 | Malinowski et al. | | 250/235 |
| 4,862,276 A * | 8/1989 | Wang et al. | | 348/306 |
| 5,323,186 A | 6/1994 | Chow | | |
| 7,015,954 B1 * | 3/2006 | Foote et al. | | 348/218.1 |
| 2003/0193589 A1 * | 10/2003 | Lareau et al. | | 348/294 |
| 2004/0161165 A1 * | 8/2004 | Riley et al. | | 382/294 |
| 2004/0233282 A1 * | 11/2004 | Stavely et al. | | 348/143 |

(Continued)

FOREIGN PATENT DOCUMENTS

| | | |
|---|---|---|
| WO | WO 02/43366 A2 | 5/2002 |
| WO | WO-02/43366 A2 | 5/2002 |

OTHER PUBLICATIONS

Cheol Park et al., IEEE Signal Processing Megazine, "Super-Resolution Image Reconstruction: A Technical Overview", pp. 21-36, (May 2003). XP-002333377.

(Continued)

*Primary Examiner* — Yubin Hung
(74) *Attorney, Agent, or Firm* — Birch, Stewart, Kolasch & Birch, LLP

(57) ABSTRACT

An apparatus and method for acquiring image data from a scanned, multi-bank time-delay and integrate (TDI) focal plane array (FPA) detector. Specifically a method and apparatus for warping and combining sequentially-acquired image data of a scene portion from multiple TDI detector banks into a single image having improved image quality, thereby providing improved FPA sensitivity. Also, a method and apparatus for enabling sensitivity and areal rate trade-offs in a multi-bank, scanning TDI FPA based on the number of TDI banks being used for sequential imaging of the same scene portion.

36 Claims, 10 Drawing Sheets

U.S. PATENT DOCUMENTS

| | | | |
|---|---|---|---|
| 2005/0273011 A1* | 12/2005 | Hattery et al. | 600/476 |
| 2006/0269155 A1* | 11/2006 | Tener et al. | 382/243 |
| 2007/0002131 A1* | 1/2007 | Ritchey | 348/39 |
| 2007/0024824 A1* | 2/2007 | Damera-Venkata et al. | 353/94 |
| 2007/0242135 A1* | 10/2007 | Rosenblum et al. | 348/144 |
| 2008/0007813 A1* | 1/2008 | Wang et al. | 359/245 |
| 2008/0025565 A1* | 1/2008 | Zhang et al. | 382/103 |
| 2008/0144932 A1* | 6/2008 | Chien et al. | 382/169 |

OTHER PUBLICATIONS

Choi et al., Department of Electrical and Electronic Engineering, "Super-Resolution Approach to Overcome Physical Limitations of Imaging Sensors: An Overview", vol. 14, pp. 36-46, (Mar. 2004). XP-002504039.

* cited by examiner

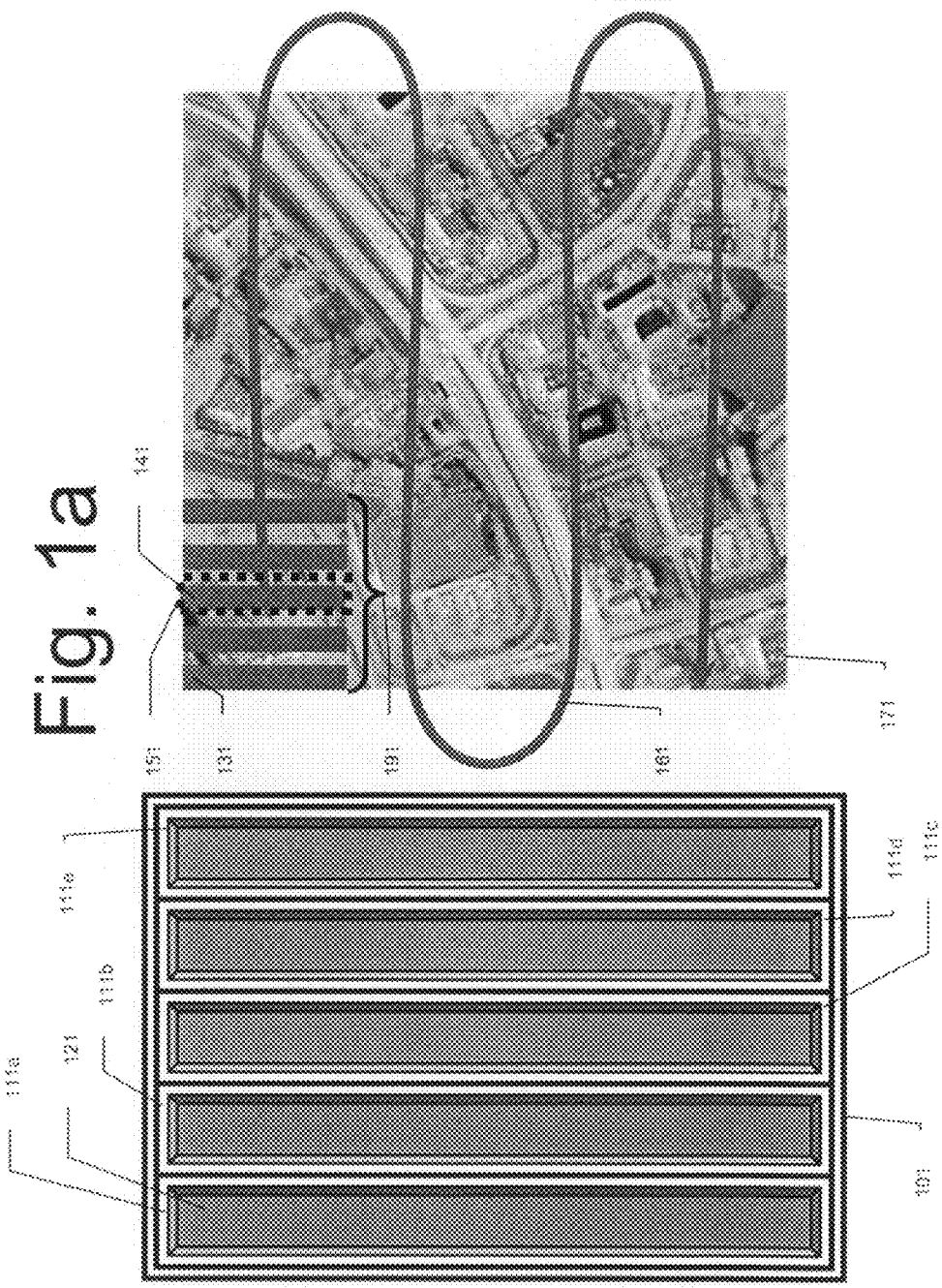

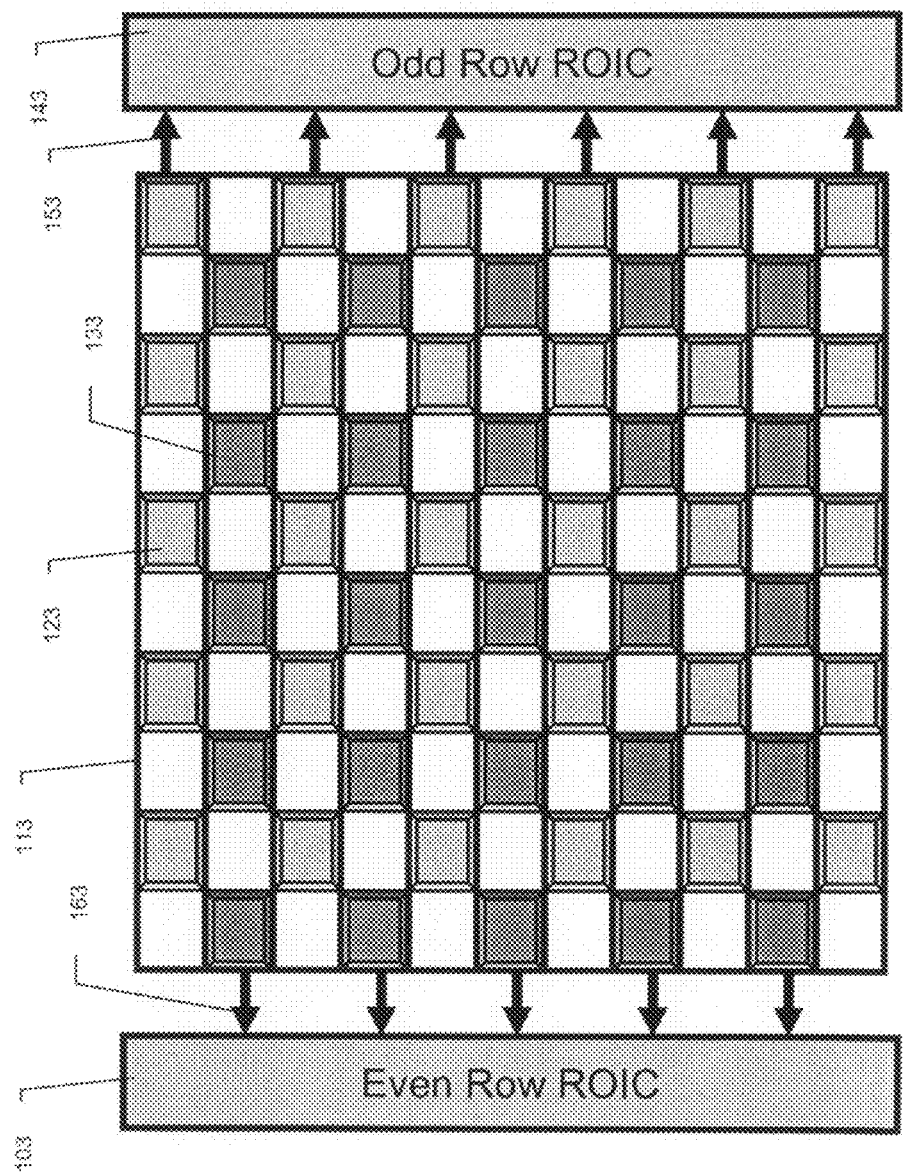

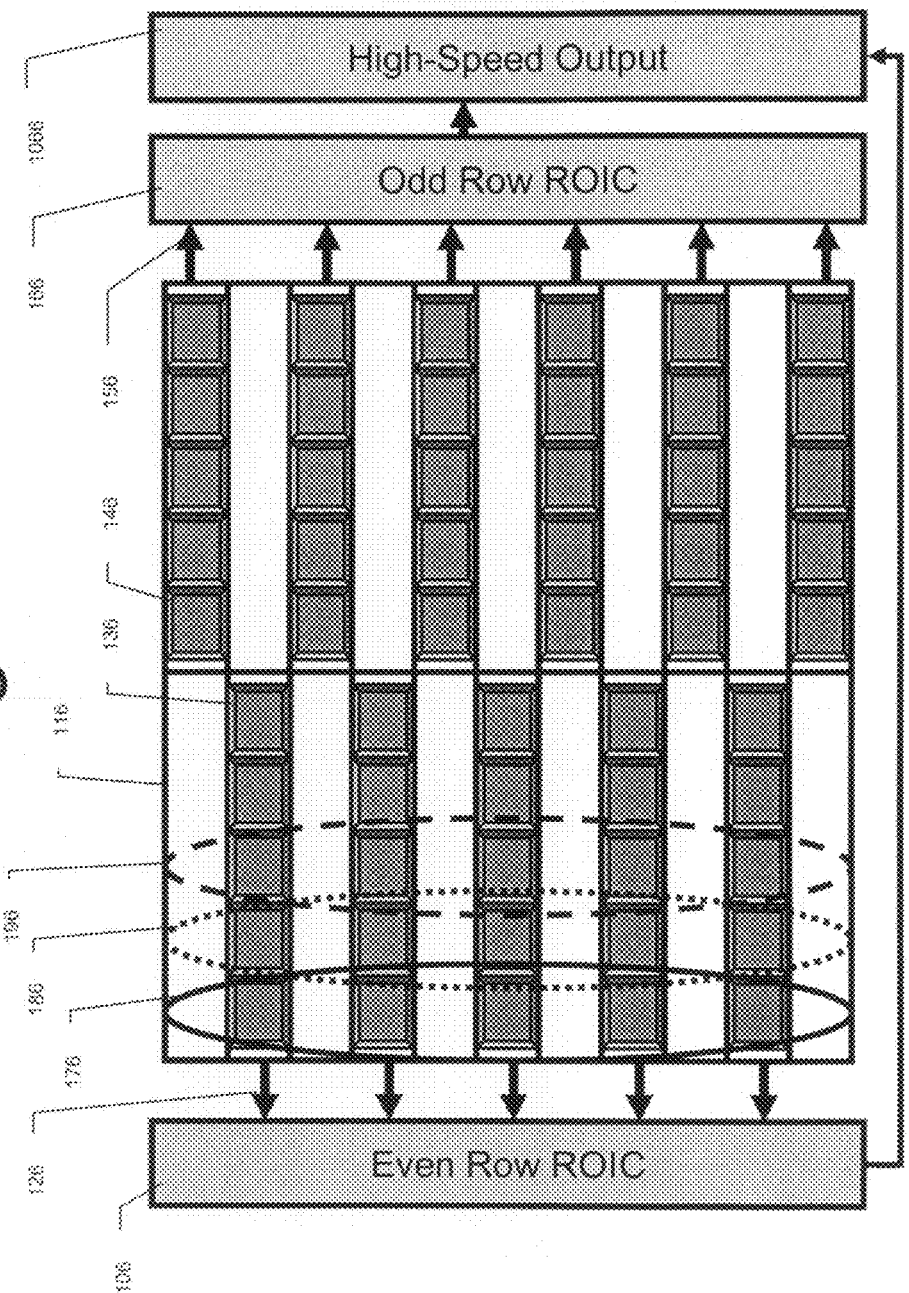

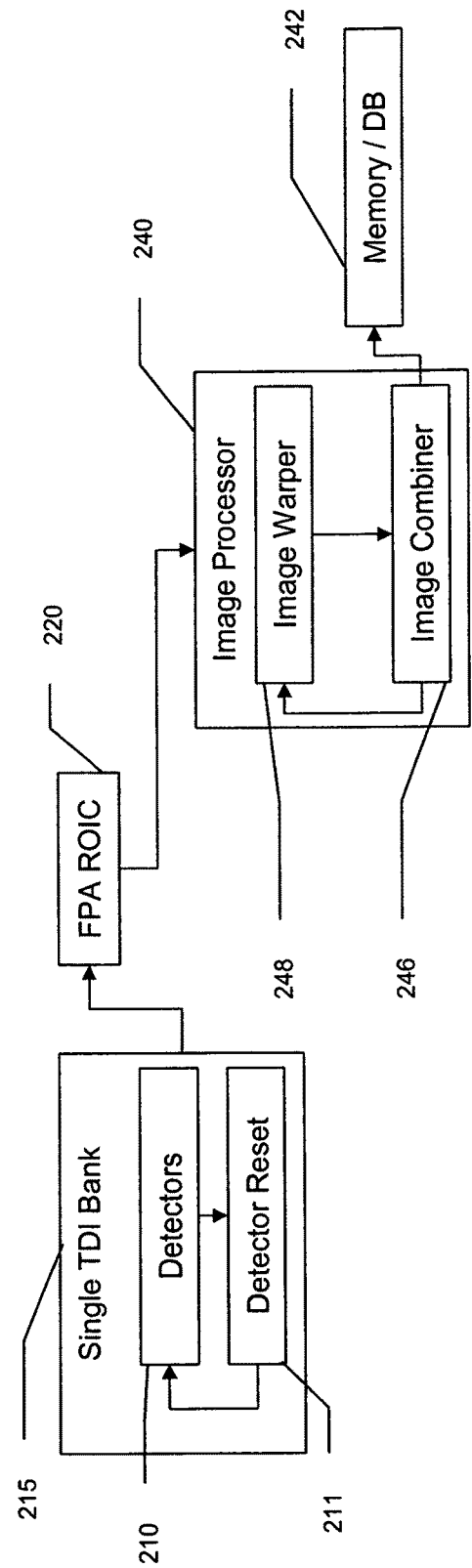

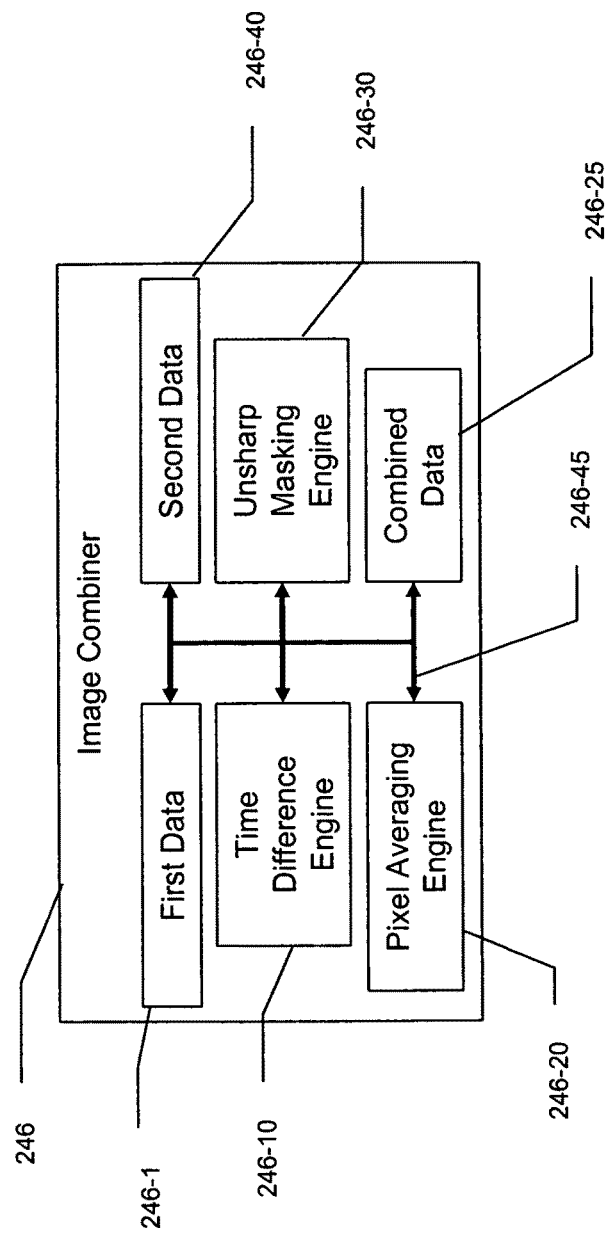

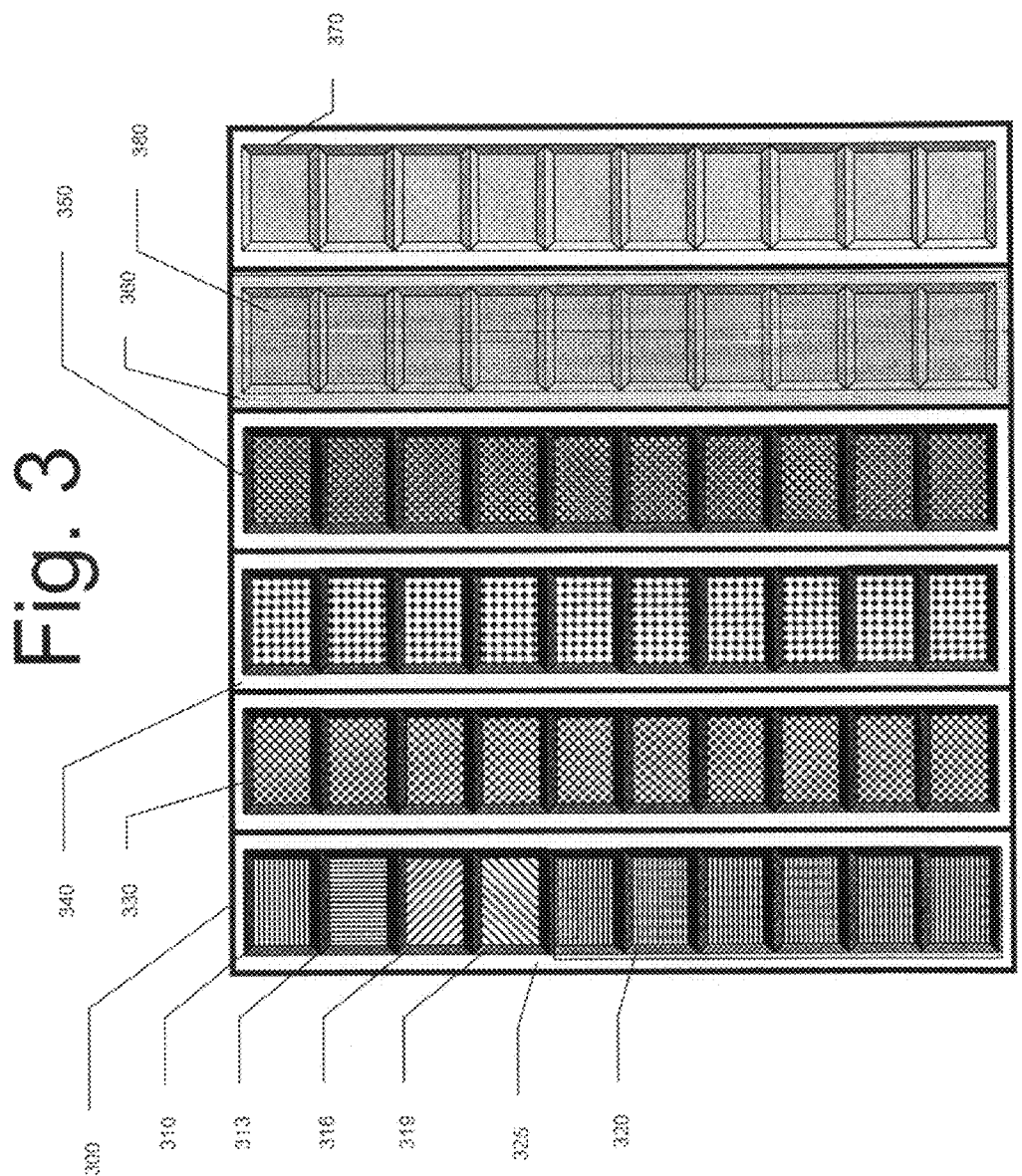

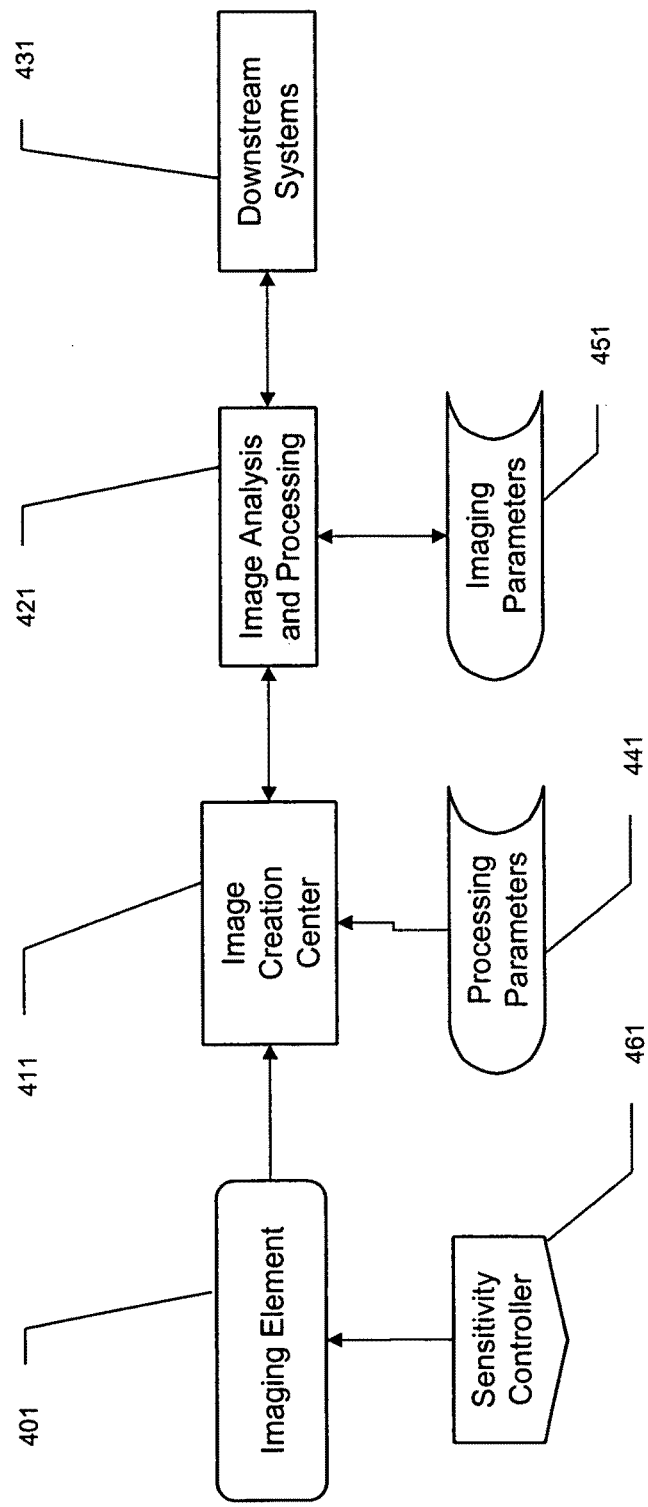

MULTI-BANK TDI APPROACH FOR HIGH-SENSITIVITY SCANNERS

CROSS REFERENCE TO RELATED APPLICATION

This nonprovisional application claims the benefit of U.S. Provisional Application No. 60/957,612, filed on Aug. 23, 2007, as allowed under 35 U.S.C. §120.

TECHNICAL FIELD OF THE INVENTION

The present invention relates in general to the capture and analysis of image data, and more particularly, to a system and method for high-sensitivity image data acquisition in applications requiring high scan velocities and low revisit times.

BACKGROUND OF THE INVENTION

Acquiring imagery of very large surveillance areas with low revisit times is pushing available technology beyond the current state-of-the-art. Large staring FPAs (Focal Plane Arrays) can be used in a "step-stare" pattern to cover large areas but a mechanism is required to step the LOS to the new stare location, settle sufficiently so there is no LOS motion during the integration time, and then collect the image. This process is very inefficient because the integration time is low compared to the LOS slew and settle time. This severely limits the amount of steps per second and therefore impacts the area coverage per second (areal rate) or revisit time. The short revisit times, caused by the ever-increasing speed at which objects carrying such arrays travel, means that an array operating at a limited areal rate may not capture all the necessary or desired information as it traverses a scene or an area.

Scanning FPAs with multiple detectors in a row, called TDI (Time Delay and Integrate) elements, solve some of the issues encountered by staring FPAs, but also raise other issues that make them challenging for use on large surveillance areas with low revisit times. The short revisit time requirements demand very high scan rates and consequently result in low sensitivity.

The sensitivity issue may be addressed by increasing the number of TDI elements in a scanning FPA, but as the number of TDI elements increase, it becomes increasingly difficult to restrict a given element in a scene to travel within a single TDI row. Lens barrel distortion and scan geometry are some of the common factors that may move a given scene portion off of a given detector bank; resulting in a blurry picture and relatively little sensitivity improvement from the TDI operation.

In the past, the number of elements in TDI was limited and lower scan rates were used to ensure sufficient sensitivity. Alternatively, step-stare approaches were used with dramatically higher revisit times and small surveillance areas. Very large optics and changing flight patterns for more favorable camera/scene geometry can allow more TDI elements (and therefore higher scan velocity). This improves sensitivity with a TDI element bank to some degree but, not sufficiently to achieve the areal rates required by new missions.

SUMMARY OF THE INVENTION

An embodiment of the present invention takes advantage of on-chip digital FPA technology that allows multiple TDI banks to be printed next to each other (in the in-scan dimension) on the same FPA with low power levels. In an embodiment of the invention, each bank of a multi-bank TDI FPA separately records a different region of a scene as the FPA scans across it. Embodiments of the invention may permit for the same region of a scene to be scanned by multiple TDI banks on the same FPA. In such embodiments, after the same scene region has passed over multiple TDI banks, the image from each of those multiple banks may be subjected to a range of image processing techniques (henceforth referred to as "warping") to match the image data from that TDI bank to the reference frame of some other particular TDI bank (or another reference image plane). The processed images from each bank may then be added together to achieve a signal-to-noise improvement on the order of $\sqrt{n}$, where n is the number of TDI banks.

The type of image processing ("warping") required may involve common techniques known in the art of image processing. In some embodiments of the present invention, affine or projective transforms may be sufficient to correct camera, scan, and ground orientation distortions. In embodiments of the present invention, optics distortion (e.g. pincushion or barrel-distortion) effects may be corrected with a small order polynomial function of the pixel's distance from the optic centerline. An embodiment of the invention present invention may also employ an appropriate common algorithm(s) to properly realign the separate bank's images to sub-pixel accuracy.

The inventive approach may also allow for rapid switching to a multi-color or multi-polarization system with the introduction or utilization of separate filters aligned to each of the separate banks at times when sensitivity or areal rates can be reduced.

An imaging system employing the present invention allows for a multi-bank TDI scanning FPA (equivalent in size and appearance of a large staring FPA) to achieve 100× the areal scan of a comparably-sized staring FPA operating in a step-stare pattern. Unlike a step-stare system, a scanned imaging system does not need to account for slew and settle times. Because the motion is continuous, there is no settle time involved.

The signal-to-noise ratio in a scanning system is directly proportion to the square root of the number of TDI banks simultaneously imaging a portion of a scene. The areal rate of a scanning system is inversely proportional to the number of TDI banks simultaneously imaging a portion of a scene. An imaging system according to the present invention may therefore be adaptively or dynamically configured to provide a range of areal rates at different sensitivity levels. Embodiments used in munitions or targeting systems that locate and then lock on to especially hot or bright targets may, for instance, slowly scan the area for a target at high sensitivity and then reduce sensitivity and increase areal rate to better maintain a lock on a fast-moving target. Embodiments that are configured with spectral or polarization filters on some TDI banks may also employ adaptive TDI bank recruitment and division strategies to alternate between high-sensitivity, multi-spectral imaging applications and fast, cross-spectrum analysis of an area to identify potential locations of interest.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF DRAWINGS

The present invention will become more fully understood from the detailed description given hereinbelow and the accompanying drawings which are given by way of illustration only, and thus are not limitative of the present invention, and wherein:

FIG. 1a shows a multi-bank TDI scanning FPA device according to the invention and its associated image capture pattern;

FIG. 1b shows an embodiment of a TDI bank in a multi-bank TDI scanning FPA according to the invention in a cross-scan read-out arrangement;

FIG. 1c shows an embodiment of a TDI bank in a multi-bank TDI scanning FPA according to the invention in an in-scan read-out arrangement;

FIG. 2a shows an embodiment of an image detection and processing system according to the present invention;

FIG. 2d shows an embodiment of an image combiner according to the present invention;

FIG. 3 shows an embodiment of a multi-bank TDI scanning FPA device according to the present invention with different filters on some of the scanning banks;

FIG. 4 shows an embodiment of an imaging device according to the present invention.

Figure 2B:
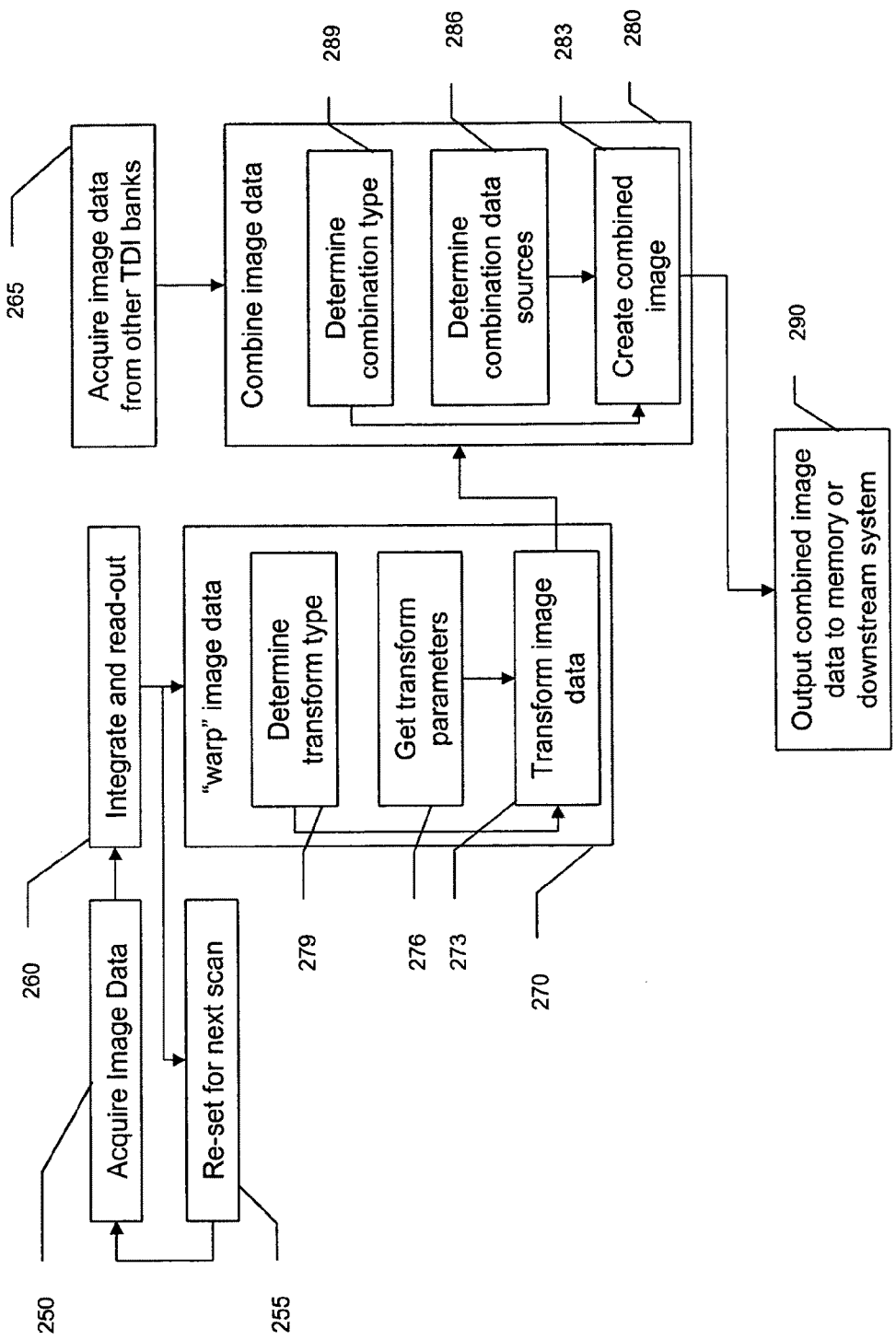
FIG. 2b shows an embodiment of an image detection and processing workflow according to the present invention.

The drawings will be described in detail in the course of the detailed description of the invention.

DETAILED DESCRIPTION

The present invention comprises a method and apparatus for acquiring high-sensitivity, low-noise image data in applications that require high scan velocity and low revisit time. Examples of such applications may include optical systems on high-altitude aircraft, unmanned aerial vehicles (UAVs), and satellite imaging systems.

Step-stare imaging approaches using a staring FPA can produce high quality images with relatively low noise and good image detail, but the process of scanning a scene becomes prohibitively time-consuming when attempting to either image fast-moving objects or capture image data from a fast-moving imaging platform. A partial solution to this issue is provided by using single-bank and multiple-bank TDI imaging systems. A TDI bank is narrow array of detectors oriented perpendicular to the scanning direction. The array of detectors may be a 1×N array, where N is the number of detectors, or may be a narrow M×N array, where M is the number of rows or columns of N detectors. The main differences in a TDI and staring FPA system are in the integration and read-out of image data. The composition of the detector elements in a TDI bank allows for the same range of detector types and detector materials as that in a staring FPA.

Serial scan systems do not include TDI and will suffer from very long revisit time, very poor signal-to-noise ratio (SNR), or small coverage area. TDI systems improve SNR by roughly the square root of the number of TDI elements. However, employing too many TDI elements can result in a loss of image quality due to correlation errors in the scan dimension due to imperfect scan velocity and errors in the cross-scan dimension due to optical distortion effects. The present invention seeks to mitigate the correlation errors in scan and cross-scan dimensions and improve SNR using multi-bank TDI. The improved SNR can be used to detect less intense objects or traded for larger area coverage or shorter revisit time.

The concept of single-bank TDI imaging is already known in the art and a discussion of the underlying principles is therefore omitted. FIG. 1a shows a multi-bank TDI imaging system printed on a single FPA 101 as well as the scanning pattern 161 associated with such a system. Alternative embodiments of the present invention may have different scanning patterns, such as ones that traverse an image plane in vertical sweeps, or ones that move diagonally. Yet further embodiments may employ a circular scanning pattern. Such an embodiment may require different FPA geometry, such as an arrangement with few TDI elements near the center of the field of view (FOV) and many disposed at the edges of the FPA in wedge shapes. Such a scan pattern and associated FPA geometry may provide more efficient scan patterns in optical systems that employ devices such as derotation prisms.

An embodiment of the multi-bank TDI scanning approach may allow, as the TDI FPA 101 scans across the scene 171, for each element of the scene 151 to be imaged by the detector elements 121 in each TDI bank 111a-e in the array of TDI banks on the FPA 101. Alternate embodiments of the present invention may employ different scanning rates and techniques, possibly allowing for only partial re-imaging of a scene by multiple TDI banks or, in some embodiments, allowing for no re-imaging at all. An embodiment of the present invention may allow for a reduced scan rate in order to improve SNR at the expense of coverage area or revisit time, or may allow for an increased scan rate at the expense of SNR in order to improve coverage area or allow for more revisit time. The specific scan rate and scan configuration selected for an embodiment of the present invention may depend on factors such as intended applications and other associated hardware.

In one embodiment of the present invention, after the last TDI bank 131 scans the same scene portion 151 as the first TDI bank 141, the image data collected by each TDI bank is processed ("warped") to the frame of reference of the first TDI bank 141. "Warping" may include techniques such as affine transforms, projective transforms, similarity transforms, small-order polynomial functions, Fourier-based approaches, and whole-image registration techniques. "Warping," generally defined, is some mapping of the destination image coordinates (x,y) to the input image coordinates (u,v), usually by a function: (x,y)=F(u,v). Such a transformation may be designed to accommodate a wide range of image distortions, such as shear, rotation, and scale-factor changes. Certain types of "warping" may be employed to make sure ground-pixel elements from the input image properly register with those from a reference image (from say the first TDI bank) so that they can be summed for signal/noise improvements.

In some embodiments, the inverse function (u,v)=G(x,y) may be used to find which pixel (u,v) in the input image is required to produce an output image at position (x,y). In some embodiments or applications of the inverse function, such computed coordinates (u,v) may not be integer values, but may instead lie between pixel elements. In such cases, an interpolation function may be used to produce the "effective pixel value" at the fractional pixel position (u,v) (e.g. (u,v)=(314.73, 10.234) might do a simple weighted average of pixels (314, 10), (315, 10), (314, 11), and (315, 11)).

The type of warping technique employed may depend on the specific sorts of image distortions compensated for, or may depend on what a particular embodiment of the present invention is intended to accomplish. Embodiments of the present invention may employ affine or projective transforms to correct camera, scan, and ground orientation distortions for in-flight applications. Projective transforms may be especially useful in embodiments of the present invention where the imaging platform is moving on an arced or curved path relative to the area being imaged. Embodiments of the present invention may also employ small-order polynomial functions to correct lens distortions, such as barrel or pincushion distortions, introduced by optics elements. Yet further embodiments of the present invention may employ techniques that allow for image registration at overlapping 'seams' between TDI banks. Still other embodiments may employ techniques such as image warping with correlation for regions that overlap between TDI banks in order to resample and integrate the multiple overlapping regions. One embodiment of the present invention may employ, as a warping function or set of functions, a form of extended range image processing (as described in patent application Ser. No. 11/429,958, filed May 9, 2006) to "stack" separate images of the same scene created by multiple TDI banks, thereby resampling and integrating the images to improve sensitivity.

Alternative embodiments of the present invention may simply calibrate any associated optics components or introduce additional components to mechanically remove distortion effects before incoming light is detected. Yet further embodiments of the present invention may take more exotic image processing approaches such as applying different warping techniques to image data from different TDI banks, or merging image data from two TDI banks according to a first image processing approach, merging image data from two other TDI banks according to a second image processing approach, and then further combining the merged image data according to yet further image processing techniques until a desired composite or combined image is produced. Still further embodiments of the present invention may combine frame stacking and tiling techniques to create large mosaic images.

FIG. 1b shows one possible configuration for a TDI bank in a multi-bank TDI FPA 113. In the embodiment depicted, there are two read-out integrated circuits (ROICs), one for even rows of the FPA 103 and one for odd rows 143. Both ROICs are connected to their respective rows 163,153. These connectors may be made of any suitable material, including materials suitable for cold soldering, such as indium. The configuration shown is sometimes referred to as a "cross-scan" configuration because the even rows of pixels 133 and odd rows of pixels 123 are distributed in a checkerboard pattern that runs across the scanning direction. FIG. 1c shows an alternative configuration for a TDI bank in a multi-bank TID FPA 116. The even and odd ROICs 106,166 and their associated connectors 126, 156 may employ a range of materials and configurations similar to those noted with respect to FIG. 1b. The configuration depicted in FIG. 1c is sometimes referred to as an "in-scan" configuration because the even rows of pixels 136 and odd rows of pixels 146 are separated into continuous rows in the scanning direction. In either of the configurations depicted, as an image is scanned across the TDI element, each pixel location in object space is scanned first by TDI-1 176, then TDI-2 186, then TDI-3 196, and so on. The first TDI sample 176 is time delayed and combined with TDI-2 186, and so on. Many TDI bank configurations and ROIC connections are possible. Variations are limited only by the states of integrated circuit and electro-optical detector technology. Embodiments employing scan patterns that are not primarily vertical or horizontal based may use completely different TDI bank configurations, such as an embodiment designed for a circular scanning pattern. Yet more exotic configurations, such as diagonally-oriented or oval-shaped TDI banks, may be suitable for specific detection applications. Also, embodiments of TDI banks may be equipped with one or more high-speed outputs 1066. Embodiments having a single output for multiple ROICS may allow for the high-speed output 1066 to combine or delay individual ROIC outputs, whereas embodiments having a single output for a single ROIC may eliminate combination capabilities.

Although only five TDI banks are depicted in FIG. 1a, embodiments of the present invention may have as few as two TDI banks or may have as many TDI banks as can be accommodated on a single FPA. Yet further embodiments may have multiple TDI banks on multiple chips oriented on a "daughter board" to form an FPA. One particular embodiment of the present invention may employ eight or more banks of 6000× 24 in-TDI elements at scan rates that may exceed 1 KHz in each bank. A multi-bank TDI FPA combined with an image data combination approach according to the present invention may provide improvements in sensitivity on the order of the square root of the number of banks used. An embodiment according to the present invention that employed sixteen banks would therefore provide a 4× sensitivity improvement over a conventional multi-bank TDI imaging approach.

FIG. 2a shows an embodiment of a TDI detector bank and its associated components in a scanning TDI detector device according to the present invention. Image data captured by detectors 210 in a single TDI bank 215 is read out by an ROIC 220 and then warped and combined with image data from other TDI banks before being output to memory, storage 242 or downstream systems. After image data is captured by the detectors 210 on the TDI bank 215, it is integrated and read out by the ROIC of the FPA 220. In embodiments of the present invention where each TDI bank has its own ROIC, an intermediate read-out and data combination step may be required. The detectors of the TDI bank are then reset 211 to scan the next portion of the scene. The read-out image data is passed to an image processor 240. The processor has an image warper 248 that "warps" the image data (using any of the above-mentioned techniques, or any other relevant techniques known in the art of image processing) to an appropriate frame of reference. In alternative embodiments of the present invention, the image warper may be omitted or replaced or supplemented with image processing components such as a super-resolution engine or various noise removal or signal filtering components. Once warping (and other additional or substitute image processing) is completed on the TDI bank image data, the image data may be combined with image data from other TDI banks by an image combiner 246. Image combination may be accomplished by computing average pixel intensities across both images being combined, or may employ a form of extended range image processing (as described in patent application Ser. No. 11/429,958, filed May 9, 2006). Yet further embodiments of the present invention may utilize polarimetry processing in conjunction with different polarization filters applied to different TDI banks, spectral processing in conjunction with different spectral filters applied to different TDI banks, temporal differencing to detect moving targets, or unsharp mask filtering where incoming image data is selectively focused and de-focused as it moves across TDI banks. In embodiments employing alternate image processing or image analysis techniques, the combination process may be replaced with alternative techniques such as difference processing, or may be a multi-step, multi-stage process where different individual images from different TDI banks are combined with, compared against, or otherwise processed relative to images from other TDI banks or relative to composite images resulting from the combination, comparison, or otherwise processed image data obtained from one or more other TDI banks.

In an embodiment of the present invention, the image combiner 246 may then send the resulting combined image data as output to memory, database storage 242 or to further systems for analysis and evaluation of image content. Such systems may include targeting, guidance, or surveillance systems, or any other system or application that requires high-sensitivity imaging data.

FIG. 2b shows a functional flowchart that depicts the workflow and data flows between the components identified in FIG. 2a. In an embodiment of the present invention, a TDI bank in a multi-bank TDI FPA may acquire image data 250. That image data is then integrated and read out 260 and the TDI detector bank is reset for the next image acquisition cycle 250. The read-out image data is then subjected to "warping" 270. An embodiment of the image "warping" process may require a determination or selection of the appropriate warp or transform type 279. These may include projective or affine transforms to correct ground orientation or change of perspective distortions, small-order polynomial functions to correct lens distortion, or other image transformation techniques such as whole-image registration to warp the entire image data into a different frame of reference. Embodiments of the image "warping" process may also require determination or input of transform parameters 276. These parameters may be things such as known distortions introduced by the flight path of a vehicle carrying an embodiment of the inventive system, or may be the identification of a particular frame of reference for whole image warping or registration. Once the type of 'warping' and the parameters are determined for an embodiment of the present invention, the image data may then be subjected to the appropriate transformations 273 before being subjected to image data combination processing 280.

Embodiments of the image combination process may require a determination or a selection of an appropriate combination type 289. Combination types may include pixel averaging, super-resolution, polarimetric processing, spectral processing, extended-range processing, temporal differencing, unsharp masking, and frame stacking. Embodiments of the image combination process may also require a determination of suitable or applicable data sources 286 for a given combination type. Sets of image data all warped to the same frame of reference may be suitable for combination, as may image data subjected to certain forms of filtering or noise reduction processing. Once the combination type and data sources are determined, the image data may be combined to create combined or composite image data 283. In some embodiments, instead of combining all the image data from all TDI detector banks in a single pass, the combination process may proceed in several simultaneous or sequential stages that incrementally combine subsets of all the image data acquired from the TDI FPA in a scanning cycle. Such embodiments may be suitable for instances where part of the TDI detector banks on an FPA only detect filtered image data, or where not every TDI bank is used to sequentially image part of a scene during a scanning cycle. Once the image data combination process completes for a set of image data from a scanning cycle, that image data may be subsequently output to memory, storage, or downstream systems 290 for further processing.

Figure 2C:
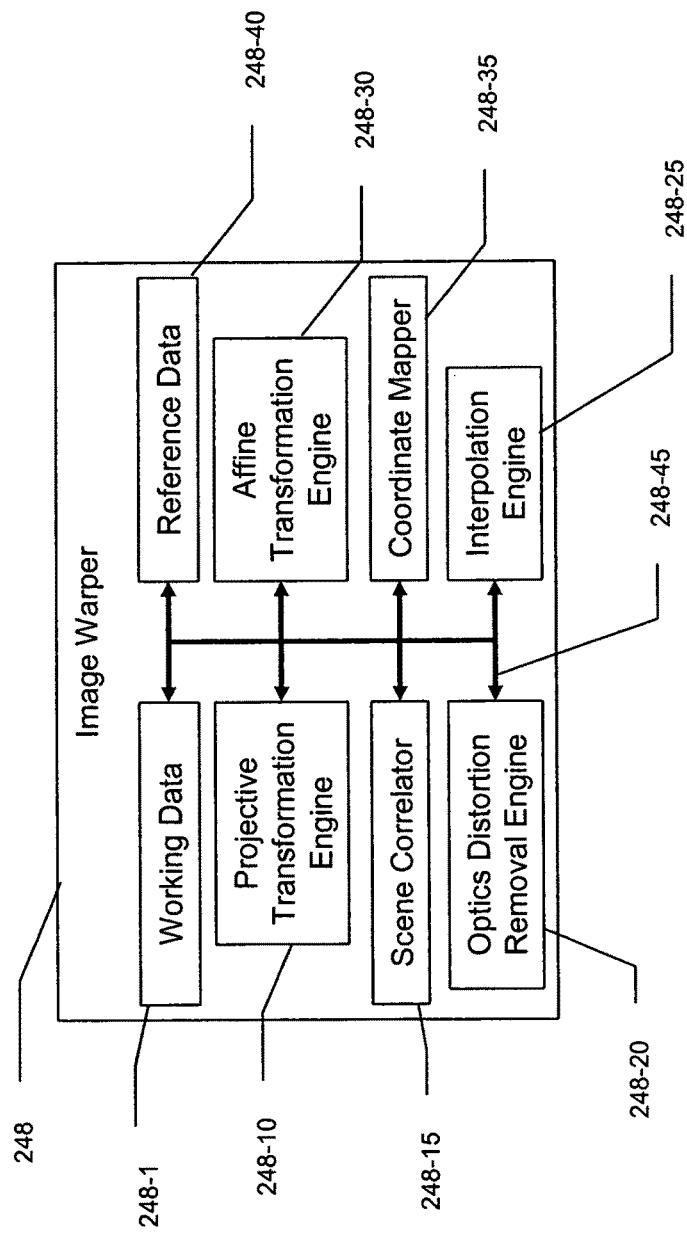
FIG. 2c shows an embodiment of an image warping engine according to the present invention.

FIG. 2c shows an embodiment an image warper 248 that provides a broad range of image warping and mapping capabilities. In addition to storing the working data 248-1 that is being operated on, an embodiment of an image warper according to the present invention may also store reference data 248-40 that governs the extent and type of warping performed. An embodiment of an image warper according to the present invention may have discrete logical or functional units configured for different warping types, such as a projective transformation engine 248-10 for perspective changes, an affine transformation engine 248-30 for uniform distortion removal, a scene correlator 248-15, an optics distortion removal engine 248-20 for removing known or expected distortion effects (such as lens barrel distortion), a coordinate mapper that can express the coordinate space of the working data 248-1 in terms of the reference data 248-40 or other baseline image data, and an interpolation engine 248-25 that may provide pixel or other image data values for non whole-number coordinates. A physical or logical bus 248-45 or similar data exchange system may be provided to allow the various physical or logical units within the image warper to exchange and output data. Further embodiments of image warpers according to the present invention may have other logical or physical components for yet further types or variations of image warping, such as extended-range image processors, object or feature registration units, or portions of super-resolution engines.

FIG. 2d shows an embodiment of an image combiner 246 that provides a broad range of image combination capabilities. In addition to storing two sets of image data 246-1, 246-40 for combination, an embodiment of an image combiner according to the present invention may also store combined data 246-25 for output or further processing. The functional portions of an embodiment of an image combiner may be separated into discrete logical or physical portions, and may, in some embodiments, include a time differencing engine 246-10 for detection of moving targets, an unsharp masking 246-30 engine for unsharp mask filtering operations, or a pixel averaging engine 246-20 for creating average pixel values from two or more data sets. A physical or logical bus 246-45 or similar data exchange system may be provided to allow the various physical or logical units within the image combiner to exchange and output data. Further embodiments of image combiners according to the present invention may have more or fewer data storage areas and may be equipped with more or different functional units such as edge or magnitude data combination units, portions of super-resolution engines, or image data combination aspects of extended-range image processing solutions (such as frame stacking).

As shown in FIG. 3, a multi-bank TDI FPA 300 according to the present invention may have multiple types of TDI detector banks, or multiple types of filters applied to one or more TDI banks. A given TDI bank 325 may have one or more different types of detectors, such as ones that detect or exclude a specific frequency waveband (i.e. MWIR) 310, ones that detect or exclude a specific polarization range 313, ones that detect or exclude a specific signal intensity rage 316, or any combination thereof 319. All or part of a TDI bank 325 may also be covered with a filter or coating 320 that provides spectral range, intensity range, or polarization filtering effects to multiple detectors in the TDI bank. A TDI bank array 300 according to the present invention may also have entire TDI banks that have different types of detectors, such as one or more banks that only detect a specific frequency waveband or wavebands 330, or that only detect specific polarizations or polarization ranges 350. An alternative approach to achieving such effects is to manufacture a TDI bank array 300 having all TDI banks of one detector type 370, 380, with some or all of certain detector banks being covered by various types of filters 360.

FIG. 4 shows an imaging apparatus according to the present invention. The imaging element 401 contains a multi-bank TDI FPA and any other relevant image acquisition components, such as optics. The optics may include components such as lenticular lens arrays, variable focus lenses, or fixed optics components. The image creation center 411 is the portion of the device that "warps" or otherwise processes and combines or compares the image data detected by each TDI bank. A memory area containing processing parameters 441 may be used to determine the specific types of warping, combination, comparison, and other image processing operations carried out. An image analysis and processing section 421 may be employed to perform initial image analysis and additional processing in certain special-purpose applications, such as a missile seeker with specific target acquisition parameters. The parameters for the additional processing 421 may be stored in a separate memory area 451. Once the system completes acquisition, warping, combination, and any other additional processing of multi-bank TDI imagery, the resultant image data may be sent to further downstream systems 431, such as guidance, targeting, or surveillance systems, for more processing and analysis.

Alternate embodiments of the present invention may also employ a sensitivity controller 461 that allows for dynamic adjustments to the imaging element to establish desired areal rate and sensitivity by recruiting multiple TDI image banks to view the same portion of a scene, or dividing a group of TDI image banks so that each images a different portion of a scene. Having multiple TDI banks image a portion of a scene may improve image sensitivity (i.e. signal-to-noise ratio) by a factor proportional to the square root of the number of TDI banks employed. Reducing the number of TDI banks directed at the same portion of a scene may allow for increases in areal rate inversely proportional to the number of TDI banks imaging the same scene portion. Such trade-offs between image sensitivity and areal rate may be fixed during system installation or otherwise manually or mechanically altered. In other inventive embodiments, however, such trade-offs between areal rate and sensitivity may be performed dynamically by the system or associated control programs, or manually by a user-operator while the system is operational. Such inventive embodiments may also employ a broad range of warping functions or sets of warping functions that may be selected for use based on the number of TDI banks currently used for imaging a given portion of a scene.

Figure 5:
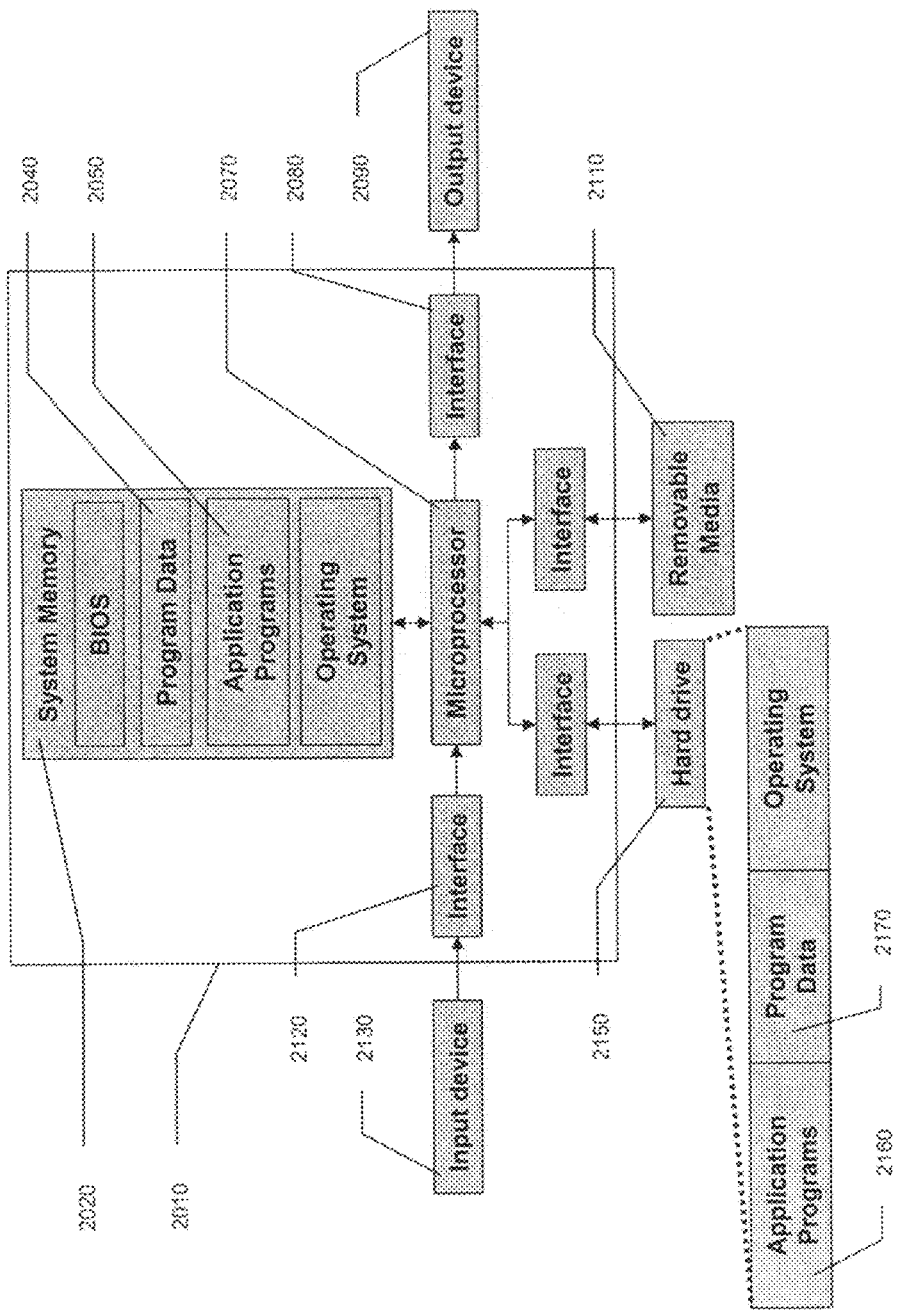
FIG. 5 shows an embodiment of a computer-controlled image data processing system according to the present invention.

FIG. 5 shows a computer system running an application that processes image data according to the present invention. In this embodiment of the invention, the imaging element 401 is an input device 2130 with an interface 2120 to image processing, "warping" and combination/comparison application programs 2050 and their associated program data 2040, which are stored in system memory 2020 and operated on by the microprocessor 2070. The application programs 2160 and any associated program data 2170 such as processing parameters 441 and imaging parameters 451 may be stored in a hard drive 2150 when not in use. Once the appropriate calculations and required processing has been performed, the system 2010 provides the resultant image data to an output device 2090 such as a targeting system 431 through an output interface 2080.

Alternative embodiments of the inventive system may be implemented purely in hardware, having separate microprocessors 2070 running specialized application programs 2050 for each function of the system. Yet other embodiments of the inventive system may have a hardware configuration conducive to multiple types of image data "warping" and combination, with the particular algorithms to be used residing on removable media 2110 or other external data sources, and only being loaded into the system prior to use. The hardware configuration may also use FPGAs, ASICs, or other methods to implement the various algorithms.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A method of capturing image data from a scene using a scanning focal plane array (FPA) device that contains at least four banks of Time-Delay and Integration (TDI) detectors, the method comprising:
    imaging a first portion of the scene with the first TDI bank to create first image data;
    imaging a second portion of the scene with the second TDI bank to create second image data;
    imaging the first portion of the scene with a third TDI bank to create third image data;
    imaging the second portion of the scene with a fourth TDI bank to create fourth image data;
    warping the third image data to a frame of reference of the first image data;
    warping the fourth image data to a frame of reference of the second image data;
    generating first composite image data by combining first and warped third image data;
    generating second composite image data by combining second and warped fourth image data;
    warping the second composite image data to a frame of reference of the first composite image data; and
    combining first composite image data and warped second composite image data into third composite image data.

2. The method of claim 1, said imaging the portion of the scene with the second TDI bank comprising filtering incoming electro-optical radiation before it is detected by said second TDI bank.

3. The method of claim 2, said filtering comprising bandpass filtering a predetermined spectral band of incoming electro-optical radiation.

4. The method of claim 2, said filtering comprising polarization filtering a predetermined polarization of incoming electro-optical radiation.

5. The method of claim 1, further comprising increasing imaging sensitivity of the FPA and reducing imaging areal rate of the FPA by selecting the second portion of the scene to be the same as the first portion of the scene and performing the imaging a first portion and imaging a second portion steps sequentially during a scanning pass.

6. The method of claim 1, said warping comprising carrying out a projective transform on said second image data to change a frame of reference of the second image data into the frame of reference of the first image data.

7. The method of claim 1, said warping comprising carrying out an affine transform on said second image data to remove the effects of uniform distortions present in the second image data relative to the first image data.

8. The method of claim 1, said warping comprising removing the effects of optics distortion from said second image data.

9. The method of claim 1, said warping comprising mapping pixel coordinates from the second image data to pixels in the first image data.

10. The method of claim 9, said mapping pixel coordinates including using an interpolation function to produce an effective pixel value for fractional pixel coordinates.

11. The method of claim 1, further comprising generating an average image from overlapping portions of the first and second image data.

12. The method of claim 1, said combining comprising unsharp mask filtering to de-focus said second image data, where the first and second portions of the scene are the same portion.

13. The method of claim 1, said combining the first composite image data and the second composite image data comprising temporal differencing the first composite image data and the second composite image data to detect moving objects, where the first and second portions of the scene are the same portion.

14. The method of claim 1, further comprising performing correlation for a scene region that overlaps between the first and second TDI bank.

15. The method of claim 1, the method further comprising:
changing the time delay of the first TDI bank in the scanned multi-bank TDI detector such that it no longer images the same portion of a scene as the second TDI bank in the multi-bank TDI detector during a scanning pass, thereby increasing areal rate and reducing sensitivity; or
changing the time delay of the first TDI bank such that it images the same portion of the scene as the second TDI bank during a scanning pass, thereby decreasing areal rate and increasing sensitivity,
wherein increases in sensitivity for a portion of a scene are directly proportional to the number of TDI banks simultaneously imaging the same portion of a scene and wherein increases in areal rate for the detector are inversely proportion to the number of TDI banks simultaneously imaging the same portion of a scene.

16. A method of adaptively setting areal rate and sensitivity levels for a scanned multi-bank TDI imaging detector, the method comprising adjusting areal rate and adjusting sensitivity by:
changing the time delay of a first TDI bank in the scanned multi-bank TDI detector such that it no longer images the same portion of a scene as a second TDI bank in the multi-bank TDI detector during a scanning pass, thereby increasing areal rate and reducing sensitivity; or
changing the time delay of the first TDI bank such that it images the same portion of the scene as the second TDI bank during a scanning pass, thereby decreasing areal rate and increasing sensitivity,
wherein increases in sensitivity for a portion of a scene are directly proportional to the number of TDI banks simultaneously imaging the same portion of a scene and wherein increases in areal rate for the detector are inversely proportion to the number of TDI banks simultaneously imaging the same portion of a scene; and
changing the time delay of a third TDI bank in concert with the time delay of the first TDI bank such that
when the time delay of the first TDI bank is changed to sequentially image the same portion of the scene as the second TDI bank during the scanning pass, the time delay of the third TDI bank is also changed to sequentially image that portion of the scene during the scanning pass, and
when the time delay of the first TDI bank is changed to image said different portion of a scene than said second TDI bank, the time delay of the third TDI bank is changed to image a third portion of the scene.

17. An apparatus for capturing image data from a scene using a multi-bank scanning Time-Delay and Integration (TDI) focal plane array (FPA) device that contains at least four banks of TDI detectors, the apparatus comprising:
a first read-out integrated circuit (ROIC) that integrates and reads out the contents the first TDI bank to create first image data, wherein first image data corresponds to a first scene portion;
a second ROIC that integrates and reads out the contents of the second TDI bank to create second image data, wherein second image data corresponds to a second scene portion; and
a third ROIC that integrates and reads out the contents the third TDI bank to create third image data, wherein third image data corresponds to the first scene portion;
a fourth ROIC that integrates and reads out the contents of the second TDI bank to create fourth image data, wherein fourth image data corresponds to the second scene portion;
an image data processor that produces composite image data, where the image data processor includes
an image warper; and
an image combiner;
the image warper warping the third image data to a frame of reference of the first image data and warping the fourth image data to a frame of reference of the second image data;
the image combiner combining the first and warped third image data into first composite image data and combining the second and warped fourth image data into second composite image data;
the image warper warping the second composite image data to a frame of reference of the first composite image data; and
the image combiner combining said first and second composite image data into third composite image data.

18. The apparatus of claim 17, further comprising at least one filter disposed on at least one TDI bank.

19. The apparatus of claim 17, further comprising a sensitivity controller that increases imaging sensitivity of the FPA while decreasing imaging areal rate of the FPA by selecting the second scene portion to be the same as the first scene portion and coordinating the first and second TDI banks to capture imaging data sequentially during a scanning pass.

20. The apparatus of claim 17, the image warper including a projective transform section that changes a frame of reference of the second image data into the frame of reference of the first image data by carrying out a projective transform on said second image data.

21. The apparatus of claim 17, said image warper including an affine transform section that removes the effects of uniform distortions present in the second image data relative to the first image data by carrying out an affine transform on said second image data.

22. The apparatus of claim 17, said image warper including an optical distortion removal section that removes the effects of optics distortion from said second image data.

23. The apparatus of claim 17, said image warper including a mapping unit, that maps pixel coordinates from the second image data to pixels in the first image data.

24. The apparatus of claim 23, said image warper including an interpolation engine that produces an effective pixel value for fractional pixel coordinates.

25. The apparatus of claim 17, said image combiner generating an average image of overlapping portions of the first and second image data.

26. The apparatus of claim 17, said filter including a spectral filter that filters a predetermined spectral band of incoming electro-optical radiation.

27. The apparatus of claim 17, said filter including a polarization filter that filters a predetermined polarization range of incoming electro-optical radiation.

28. The apparatus of claim 17, said image combiner including an unsharp masking engine that performs unsharp mask filtering of the first composite image data using the second composite image data, where the first and second portions of the scene are the same portion.

29. The apparatus of claim 17, said image combiner including a time difference engine that performs temporal differencing the first image data and the second image data to detect moving objects.

30. The apparatus of claim 17, said image warper including a scene correlator that correlates a scene region from said first and second image data that overlaps between the first and second TDI bank.

31. The apparatus of claim 17, further comprising a sensitivity controller that increases imaging sensitivity of the apparatus while decreasing imaging areal rate of the apparatus by configuring the third TDI bank to image, as the third portion of the scene, the first portion of the scene after said first portion is imaged by said first TDI bank in a scanning pass, and configuring the fourth TDI bank to image, as the fourth portion of the scene, the second portion of the scene after said second portion is imaged by said second TDI bank in a scanning pass.

32. The apparatus of claim 17, the apparatus further comprising:
a sensitivity controller that increases or decreases the time delay associated with the first TDI bank in the detector such that: when time delay is decreased, said first TDI bank images a different portion of a scene than the second TDI bank in the detector during a scanning pass, thereby increasing the areal rate and reducing the sensitivity of the detector, and when time delay is increased said first TDI bank sequentially images the same portion of the scene as the second TDI bank during a scanning pass, thereby decreasing areal rate and increasing sensitivity;
where increases in sensitivity of the detector are directly proportional to the number of TDI banks on the detector that are sequentially imaging the same portion of the scene and increases in areal rate for the detector are directly proportional to the number of TDI banks on the detector imaging different portions of the scene.

33. The apparatus of claim 32, the first TDI bank having at least two read-out integrated circuits (ROICS), the first ROIC being associated with even pixel rows of the first TDI bank and the second ROIC being associated with odd pixel rows of the first TDI bank.

34. The Apparatus of claim 33, the first TDI bank having at least one output that combines, delays, and outputs data from the first and second ROICs.

35. An apparatus that adjusts areal rate and sensitivity levels for a scanned multi-bank TDI focal plane array (FPA) detector by trading off increases in one for proportional decreases in the other, the apparatus comprising:
a sensitivity controller that increases or decreases the time delay associated with a first TDI bank in the detector such that:
when time delay is decreased, said first TDI bank images a different portion of a scene than a second TDI bank in the detector during a scanning pass in a scanning direction, thereby increasing the areal rate and reducing the sensitivity of the detector, and
when time delay is increased said first TDI bank sequentially images the same portion of the scene as the second TDI bank during said scanning pass, thereby decreasing areal rate and increasing sensitivity;
where increases in sensitivity of the detector are directly proportional to the number of TDI banks on the detector that are sequentially imaging the same portion of the scene and increases in areal rate for the detector are directly proportional to the number of TDI banks on the detector imaging different portions of the scene,
said sensitivity controller increasing or decreasing the time delay associated with a third TDI bank in the detector in concert with the time delay of the first TDI bank, such that
when said controller changes the time delay of the first TDI bank to sequentially image the same portion of the scene as the second TDI bank during the scanning pass, said controller also changes the time delay of the third TDI bank to sequentially image that portion of the scene during the scanning pass, thereby further increasing the sensitivity of the detector, and
when said controller changes the time delay of the first TDI bank to image said different portion of a scene than said second TDI bank, said controller changes the time delay of the third TDI bank to image a third portion of the scene, thereby further increasing the areal rate of the detector.

36. A non-transitory computer-readable medium, having embodied thereon a program that, when executed by a computing device, causes the computing device to perform a method of adaptively setting areal rate and sensitivity levels for a scanned multi-bank TDI imaging detector, the method comprising adjusting areal rate and adjusting sensitivity by:
changing the time delay of a first TDI bank in the scanned multi-bank TDI detector such that it no longer images the same portion of a scene as a second TDI bank in the multi-bank TDI detector during a scanning pass, thereby increasing areal rate and reducing sensitivity; or
changing the time delay of the first TDI bank such that it images the same portion of the scene as the second TDI bank during a scanning pass, thereby decreasing areal rate and increasing sensitivity,
wherein increases in sensitivity for a portion of a scene are directly proportional to the number of TDI banks simultaneously imaging the same portion of a scene and wherein increases in areal rate for the detector are inversely proportion to the number of TDI banks simultaneously imaging the same portion of a scene; and
changing the time delay of a third TDI bank in concert with the time delay of the first TDI bank such that
when the time delay of the first TDI bank is changed to sequentially image the same portion of the scene as the second TDI bank during the scanning pass, the time delay of the third TDI bank is also changed to sequentially image that portion of the scene during the scanning pass, and
when the time delay of the first TDI bank is changed to image said different portion of a scene than said second TDI bank, the time delay of the third TDI bank is changed to image a third portion of the scene.

* * * * *